United States Patent [19]
Bremond

[11] Patent Number: 5,513,060
[45] Date of Patent: Apr. 30, 1996

[54] SERIES PROTECTION CIRCUIT

[75] Inventor: André Bremond, Veretz, France

[73] Assignee: SGS-Thomson Microelectronics S.A., Saint-Genis Pouilly, France

[21] Appl. No.: 331,275

[22] Filed: Oct. 28, 1994

Related U.S. Application Data

[63] Continuation of Ser. No. 987,661, Dec. 9, 1992, abandoned.

[30] Foreign Application Priority Data

Dec. 10, 1991 [FR] France ................... 91 15673

[51] Int. Cl.⁶ .................................................. H02H 9/00
[52] U.S. Cl. ............................ 361/58; 361/56; 361/111
[58] Field of Search ............................ 361/18, 56, 58, 361/60, 86, 88, 91, 111

[56] References Cited

U.S. PATENT DOCUMENTS 3,571,608  3/1971  Hurd ................................. 361/18
4,910,184  2/1990  Ishii et al. ....................... 361/86

*Primary Examiner*—Brian K. Young
*Assistant Examiner*—Ronald W. Leja
*Attorney, Agent, or Firm*—David M. Driscoll; James H. Morris

[57] ABSTRACT

An overvoltage protection circuit for a load having a determined resistance value is connected to a supply line with a predetermined polarity. An overvoltage detector is connected across the line. A first switch, normally on, is located in series with a conductor of the line and is controlled (i.e. switched to the off state) by the detector. A second switch, located in series with a resistance having the same determined value R, is disposed between the line conductors and is controlled by the detector in a complementary manner to the first switch.

22 Claims, 2 Drawing Sheets

SERIES PROTECTION CIRCUIT

This application is a continuation of application Ser. No. 07/987,661, filed Dec. 9, 1992, now abandoned.

BACKGROUND OF THE INVENTION

1. Field of the Invention

The present invention relates to the protection of components connected to a supply line and liable to be damaged by overvoltages occurring in the supply line and, more particularly, to a circuit for protecting such components.

2. Discussion of the Related Art

The present invention is particularly useful for the case when the component is a circuit comprising active elements liable to be damaged by overvoltage, this component exhibiting between its terminals an essentially resistive impedance R that normally conducts a d.c. current having a relatively high value therethrough. This component can, for example, be a ballast lamp including an internal converter powered by a d.c. voltage. This component will be referred to hereinafter as a load to emphasize the fact it is a component that normally conducts a relatively high current therethrough.

Conventional protection circuits are generally divided into two types: series protection circuits and parallel protection circuits.

A series protection circuit is schematically shown in FIG. 1. The circuit is disposed between terminals A and B of a line and terminals C and D of a load L. The following addresses the case when the voltage between terminal A and B is a d.c. or rectified a.c. voltage, terminal A being the high voltage terminal. The series protection circuit comprises, between terminals A and B, a detection circuit 1 disposed so as to detect the occurrence of overvoltage and, between terminals A and C (or B and D), a switch S1, normally on, which is switched off when the detection circuit 1 detects an overvoltage.

FIG. 2 shows a parallel protection circuit which comprises a switch S2 disposed between terminals C and D. Switch S2 is normally off, and is switched on in response to the detection of an overvoltage by circuit 1.

Numerous embodiments of series and parallel protection circuits are known in the art, and will not be described in detail herein. However, it is to be noted that, in numerous practical implementations, a single circuit component performs both the switching and detection operations. In addition, in parallel protection circuits, the switch can act either really as a switch, as represented in FIG. 2, or as a clipping component allowing passage of overvoltages over a predetermined voltage threshold. Prior art circuits are known to simultaneously use series and parallel protection components, one of which is, for example, designed to operate in case of overvoltages occurring with an abrupt rising edge, and the other in case of overvoltages with a slower rising edge.

In practice, in the past, parallel protection circuits have been predominantly used. However, the drawback of these circuits is that, when it is desired to eliminate relatively high overvoltages, the circuits must be capable of withstanding high overcharges. Hence, it is necessary to provide large-scale semiconductor components capable of withstanding high thermal shocks. Thus, the present trend is to use, as much as possible, series protection circuits.

Series protection circuits, however, also exhibit drawbacks. In particular, with reference to FIG. 1, the abrupt switching off of switch S1 in response to the detection of an overvoltage is liable to cause a still higher overvoltage back in the mains, this overvoltage being equal to $l \cdot dI/dt$, where $l$ is the line inductance. This drawback particularly occurs if the rated current in the load is high.

SUMMARY OF THE INVENTION

An object of the invention is to avoid drawbacks associated with protection circuits. Another object is to provide a series protection circuit avoiding an overvoltage being sent back in the mains in response to an overvoltage from the mains.

To achieve these objects, other features and advantages, the invention provides an overvoltage protection circuit for a component having a resistance R and connected to a supply line with a predetermined polarity. The protection circuit comprises an overvoltage detector disposed across the line. A first switch, normally on, is located in series with a conductor of the line and is controlled (i.e., switched to the off state) by the detector. A second switch, located in series with a resistance having the same value R, is disposed between the line conductors and is controlled by the detector in a complementary manner to the first switch.

According to an embodiment of the invention, the first and second switches are NPN bipolar transistors. The collector of the first transistor is connected to a terminal of the load and its emitter to the corresponding line terminal. The emitter of the second transistor is connected to the same line terminal and its collector to the other line terminal through a resistor R. An auxiliary transistor is connected to the emitter and the base of the first transistor, the emitter of the auxiliary transistor being connected to the emitters of the first and second transistors, with the bases of the second transistor and of the auxiliary transistor being connected to the other line terminal through a zener diode.

The foregoing and other objects, features, aspects and advantages of the invention will become apparent from the following detailed description of the present invention which should be read in conjunction with the accompanying drawings.

DETAILED DESCRIPTION

Figure 1:
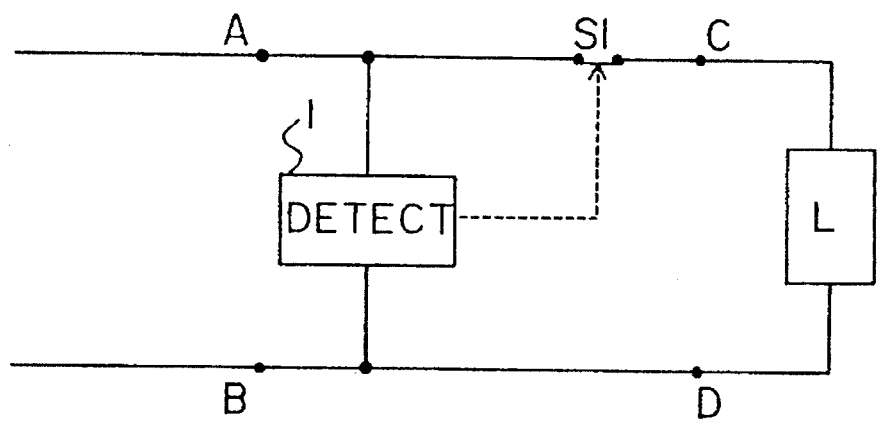
FIGS. 1 and 2, above described, schematically show conventional series and parallel protection circuits, respectively.
Figure 3:
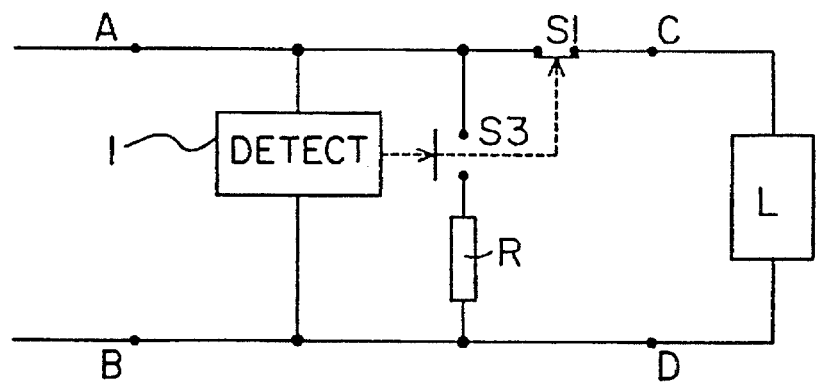
FIG. 3 schematically shows a series protection circuit according to the invention.

The circuit of FIG. 3, like the circuit of FIG. 1, comprises a load L having its terminals C and D connected to terminals A and B of a line through a protection circuit. The protection circuit includes an overvoltage detection circuit 1 and a series switch S1. In addition, the circuit includes, between terminals A and B, a switch S3 and a resistor R serially connected. Switch S1 is normally on and switch S3 normally off. Both switches are controlled in a complementary manner by detection circuit 1; that is, in response to an overvoltage, switch S1 and switch S3 are simultaneously switched off and on, respectively. Resistor R, arranged in series with switch S3, is adapted to be commensurate with load L; resistor R has the same value as the resistive impedance of load L.

Figure 2:
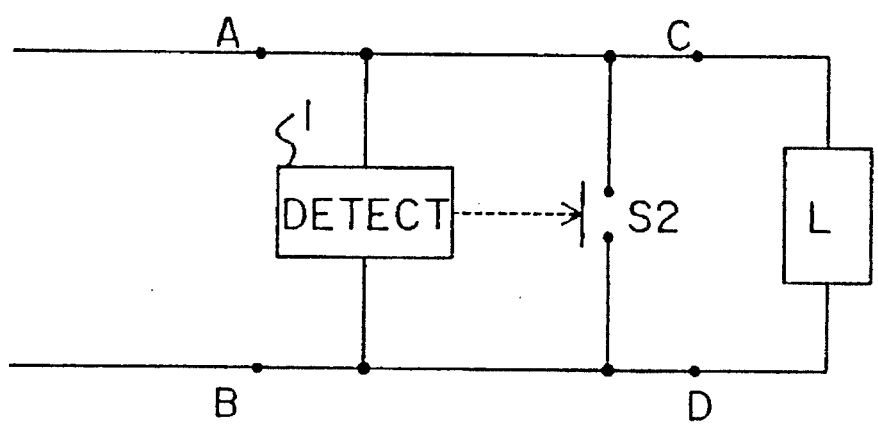

Thus, in response to an overvoltage, switch S1 is off but no l.dI/dt overvoltage occurs on the line since the switching on of switch S3 causes the line to see the same impedance as the one previously existing with load L. On the other hand, it should be noted that current in switch S3 is limited by the presence of the impedance R and that the duration of passage of current through resistor R is very short (depending upon the duration of the perturbation). Therefore, it is not necessary to provide for switch S3 a component capable of dissipating high power. In the protection circuit according to the invention, the assembly of switch S3 and resistor R no longer plays a protection role against overvoltages as was the case for switch S2 in the prior art embodiment of FIG. 2, since a relatively high voltage remains across terminals A and B. Now, the function of leg S3-R is only to match the impedance of load L and to eliminate an induced overvoltage.

Figure 4:
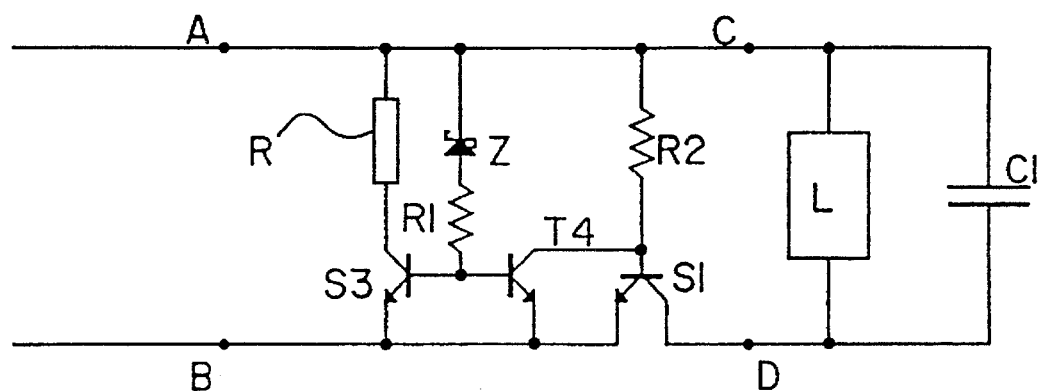
FIG. 4 schematically shows an exemplary embodiment of the circuit of FIG. 3.

FIG. 4 shows an exemplary embodiment of the circuit of FIG. 3. Switch S1, realized by an NPN transistor, is disposed on junction BD and not on junction AC like in the example shown in FIG. 3. Switch S3 is realized by another NPN bipolar transistor disposed in series with a resistor R.

The triggering circuit comprises a zener diode Z in series with a resistor R1 between terminal A and the bases of transistor S3 and of an additional transistor T4. Transistor S3 is connected through its collector to resistor R and through its emitter to terminal B. Transistor T4 is connected through its emitter to terminal B and through its collector to the base of transistor S1, which is also connected to terminal C through a resistor R2. The emitter of transistor S1 is connected to terminal B and the collector to terminal D. Zener diode Z has an avalanche voltage higher than the nominal voltage across terminals A and B.

Under normal operating conditions, the base of transistor S1 is biased by resistor R2 and transistor S1 is conductive.

When the voltage at terminal A exceeds the normal voltage, following trouble such as lightning, zener diode Z goes into avalanche mode and transistors S3 and T4 become conductive. The switching on of transistor T4 causes transistor S1 to block. When the overvoltage is interrupted, the initial state is restored.

The combination of the elements constituting the protection circuit according to the invention is relatively simple to practically integrate due to the fact that it includes, in one embodiment, three NPN transistors, having interconnected emitters. Those skilled in the art could easily implement the elements of the protection circuit in the form of a single integrated circuit except, of course, for resistor R, the value of which must be adapted to match the value of the impedance of the load L. In addition, in some types of applications, where load L also includes an integrated circuit, the elements of the protection circuit, still with the exception of resistor R, can be incorporated into the integrated circuit of load L.

As will be apparent to those skilled in the art, various variants and modifications can be made to the above disclosed embodiments. For example, FIG. 4 shows the use of an optional capacitor C1 disposed in parallel with load L, the capacitor being designed to maintain the voltage on the load during the switching off periods of switch S1.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention.

Accordingly, the foregoing description is by way of example only and is not intended as limiting. The invention is limited only as defined in the following claims and the equivalents thereto.

We claim:

1. An overvoltage protection circuit for protection of a load, the load connected to the first and second terminals of a supply line, the circuit comprising:

a first switch having a control terminal, the first switch connected in series between the second terminal and the load, the first switch being normally closed allowing current to run therethrough;

a triggering circuit, connected between the first and second terminals, including an overvoltage detector, coupled between the first and second terminals, and a second switch, responsive to the overvoltage detector and disposed between the control terminal of the first switch and one of the first terminal and the second terminal;

a first resistor having a resistance value approximately equal to an impedance of the load; and a third switch connected in series with the first resistor, the third switch and first resistor connected between the first and second terminals, each of the first switch and the third switch enabling current to flow therethrough when the respective switch is closed and preventing current from flowing therethrough when the respective switch is open, the first and third switches controlled by triggering circuit such that when the overvoltage detector detects an overvoltage, the first switch is opened and third switch is closed.

2. A circuit as claimed in claim 1 wherein the first switch includes a first transistor.

3. A circuit as claimed in claim 2 wherein the second switch includes a second transistor.

4. A circuit as claimed in claim 3 wherein the third switch includes an auxiliary transistor and the overvoltage detector includes:

a zener diode;

wherein the collector of the first transistor is connected to the load, an emitter of the first transistor is connected to the second terminal, an emitter of the auxiliary transistor is connected to the second terminal, a collector of the auxiliary transistor is connected to the first terminal through the first resistor, the second transistor is connected between the emitter and a base of the first transistor, an emitter of the second transistor is connected to the emitters of the first and auxiliary transistors, and a base of the second transistor and a base of the auxiliary transistor are connected to the first terminal through the zener diode.

5. A circuit as claimed in claim 4 further including a capacitor connected in parallel to the load across the first and second terminals.

6. A circuit as claimed in claim 5 wherein the overvoltage detector further includes second and third resistors, wherein the second resistor is connected between the zener diode and the bases of the second transistor and auxiliary transistor, and the third resistor is connected between the first terminal and the base of the first transistor.

7. An overvoltage protection circuit, coupled between first and second terminals of line and in parallel with a load, the overvoltage protection circuit comprising:

a first switch having a control terminal, the first switch connected in series between the second terminal and the load;

a triggering circuit, connected between the first and second terminals, including an overvoltage detector, coupled between the first and second terminals of the line and a second switch responsive to the voltage detector;

a first resistor having a value approximately equal to an impedance of the load; and a third switch connected in series with the first resistor, the third switch and first resistor coupled in parallel to the overvoltage detector across the first and second terminals of the line, each of the first switch and the third switch enabling current to flow therethrough when the respective switch is closed and preventing current from flowing therethrough when the respective switch is open, and the first and third switches controlled by the second switch such that when the overvoltage detector detects an overvoltage, the first switch is opened the third switch is closed.

8. A circuit as claimed in claim 7 wherein the first switch is normally closed allowing current to flow therethrough and the third switch is normally open preventing current flow therethrough.

9. A circuit as claimed in claim 8 wherein the first switch is opened when the third switch is closed and the first switch is closed when the third switch is opened.

10. A circuit as claimed in claim 9 wherein the first switch includes a first transistor.

11. A circuit as claimed in claim 10 wherein the second switch includes a second transistor.

12. A circuit as claimed in claim 10 wherein the third switch includes an auxiliary transistor and the overvoltage detector includes:

a zener diode;

wherein a collector of the first transistor is coupled to the load, an emitter of the first transistor is coupled to the second terminal, an emitter of the auxiliary transistor is coupled to the second terminal, a collector of the auxiliary transistor is coupled to the first terminal, the second transistor is coupled to the emitter and a base of the first transistor, an emitter of the second transistor is coupled to the emitters of the first and auxiliary transistors, and a base of the second transistor and a base of the auxiliary transistor are coupled to the first terminal.

13. A circuit as claimed in claim 12 wherein the collector of the auxiliary transistor is coupled to the first terminal through the first resistor and the bases of the second transistor and the auxiliary transistor are coupled to the first terminal through the zener diode.

14. A circuit as claimed in claim 13 further including a capacitor coupled in parallel to the load across the first and second terminals.

15. A circuit as claimed in claim 14 wherein the overvoltage detector further includes second and third resistors, and wherein:

the second resistor is coupled to the zener diode and to the bases of the second transistor and auxiliary transistor; and the third resistor is coupled to the first terminal and the base of the first transistor.

16. An overvoltage protection circuit, coupled between first and second terminals of a transmission line and in parallel with a load, the overvoltage protection circuit comprising:

a first means for switching between a conducting and a nonconducting state connected in series between the second terminal and the load;

a control circuit, connected between the first and second terminals, including a overvoltage detector, coupled between the first and second terminals of the transmission line and a control device which is responsive to the detector;

a resistor having a value approximately equal to the impedance of the load;

a second means for switching between a conducting and a nonconducting stated connected in series with the resistor, the second means for switching and the resistor coupled in parallel to the detector across the first and second terminals, wherein the first and second means for switching are controlled by the control device such that when the overvoltage detector detects an overvoltage, the first means for switching is switched to the nonconducting state and the second means for switching is switched to the conducting state.

17. A circuit as claimed in claim 16 wherein the first means for switching is a normally closed circuit and the second means for switching is a normally open circuit.

18. A circuit as claimed in claim 17 wherein the first means for switching switches to an open circuit and the second means for switching simultaneously switches to a closed circuit upon detection of an overvoltage condition by the detector.

19. A circuit as claimed in claim 18 wherein the first means for switching includes a first transistor.

20. A circuit as claimed in claim 19 wherein the second means for switching includes a second transistor.

21. A circuit as claimed in claim 20 wherein the control device includes and auxiliary transistor and the overvoltage detector includes:

a zener diode;

wherein a collector of the first transistor is coupled to the load, an emitter of the first transistor is coupled to the second terminal, an emitter of the second transistor is coupled to the second terminal, a collector of the second transistor is coupled to the first terminal, the auxiliary transistor is coupled to the emitter and a base of the first transistor, an emitter of the auxiliary transistor is coupled to the emitters of the first and second transistors, and a base of the second transistor and a base of the auxiliary transistor are coupled to the first terminal.

22. A method for protecting a load, connected between first and second terminals of a supply line, from overvoltages occurring across the first and second terminals, comprising the steps of:

providing a first switch connected in series between the first terminal and the load;

providing a second switch in series with a first resistor, having a resistance value approximately equal to an impedance of the load, between the first and second terminals of the supply line and in parallel with the load;

detecting, with a detector, an overvoltage across the first and second terminals of the supply line; and biasing, with a control device responsive to the detector, the first switch to an open condition and the second switch to closed condition in response to the overvoltage.

\* \* \* \* \*